(12) United States Patent
Cai

(10) Patent No.: US 9,990,334 B2
(45) Date of Patent: Jun. 5, 2018

(54) COMPUTER SYSTEM THAT EXECUTES HIERARCHICAL MK SPLINES SCHEME FOR SCATTERED DATA INTERPOLATION

(71) Applicant: Macau University of Science and Technology, Macau (CN)

(72) Inventor: Zhanchuan Cai, Macau (CN)

(73) Assignee: Macau University of Science and Technology, Macau (CN)

( * ) Notice: Subject to any disclaimer, the term of this patent is extended or adjusted under 35 U.S.C. 154(b) by 1 day.

(21) Appl. No.: 15/253,903

(22) Filed: Sep. 1, 2016

(65) Prior Publication Data
US 2018/0060277 A1    Mar. 1, 2018

(51) Int. Cl.
*G06F 17/17* (2006.01)
*G06T 11/20* (2006.01)
*G06T 17/05* (2011.01)

(52) U.S. Cl.
CPC ............ *G06F 17/17* (2013.01); *G06T 11/206* (2013.01); *G06T 17/05* (2013.01)

(58) Field of Classification Search
None
See application file for complete search history.

(56) References Cited

PUBLICATIONS

R. Franke, G. M. Nielson, Scattered data interpolation and applications: a tutorial and survey, in: Geometric Modeling, Springer Berlin Heidel- berg, 1991, pp. 131-160. doi:10.1007/978-3-642-76404-2_ 6.

L. Parra, Reconstruction of cone-beam projections from compton scat- tered data, IEEE Transactions on Nuclear Science 47 (4) (2000) 1543-1550. doi:10.1109/23.873014.

J. D. Shea, B. D. VanVeen, S. C. Hagness, A tsvd analysis of microwave inverse scattering for breast imaging, IEEE Transactions on Biomedical Engineering 59 (4) (2012) 936-945. doi:10.1109/TBME.2011.2176727.

C. Bajaj, I. Ihm, Algebraic surface design using hermite interpolation, ACM Transactions on Graphics 11 (1) (1992) 61-91. doi:10.1145/ 102377.120081.

R. Franke, Scattered data interpolation: Tests of some methods, Math- ematics of Computation 38 (157) (1982) 181-200. doi:10.2307/ 2007474.

Y. Bai, D. Wang, On the comparison of trilinear, cubic spline, and fuzzy interpolation methods in the high-accuracy measurements, IEEE Transactions on Fuzzy Systems 18 (5) (2010) 1016-1022. doi: 10.1109/TFUZZ.2010.2064170.

I. C. Briggs, Machine contouring using minimum curvature, Geophysics 39 (1) (1974) 39-48. doi:10.1190/1.1440410.

T. Ogawa, M. Haseyama, Missing image data reconstruction based on adaptive inverse projection via sparse representation, IEEE Trans- actions on Multimedia 13 (5) (2011) 974-992. doi:10.1007/978-3-642-76404-2_6.

(Continued)

*Primary Examiner* — Nicholas R Wilson
(74) *Attorney, Agent, or Firm* — Eagle IP Limited; Jacqueline C. Lui

(57) ABSTRACT

A computer system executes hierarchical MK splines for scattered data approximation. The computer system constructs an image by generating a final approximation function that approximates a scattered data set with a hierarchy of control lattice from coarsest to densest. The method includes executing MK splines approximation to the scattered data set with the hierarchy of control lattice to iteratively obtain approximation functions. The image is constructed by generating the final approximation function to construct an interpolated surface.

13 Claims, 20 Drawing Sheets original data $m = n = 8$

(56) References Cited

PUBLICATIONS

X. Chen, R. F. Riesenfeld, E. Cohen, An algorithm for direct multiplication of B-splines, IEEE Transactions on Multimedia 6 (3) (2009) 433-442. doi:10.1109/ TASE.2009.2021327.

D. Fogg, Contour to rectangular grid conversion using minimum cur- vature, Computer vision, graphics, and image processing 28 (1) (1984) 85-91. doi:10.1016/0734- 189X(84)90141-5.

E. Ringaby, O. Friman, P. E. Forssen, T. O. Opsahl, T. V. Haavardsholm, I. Kasen, Anisotropic scattered data interpolation for pushbroom image rectification, IEEE Transactions on Image Processing 23 (5) (2014) 2302-2314. doi:10.1109/TIP.2014.2316377.

E. Zavarehei, S. Vaseghi, Interpolation of lost speech segments using lphnm model with codebook post-processing, IEEE Transactions on Multimedia 10 (3) (2008) 493-502. doi:10.1109/TMM.2008.917345.

R. Franke, G. Nielson, Smooth interpolation of large sets of scattered data, Intl. J. Numerical Methods in Eng 15 (11) (1980) 1691-1704. doi:10.1002/nme.1620151110.

R. Franke, A critical comparison of some methods for interpolation of scattered data, Technical Report NPS-53-79-003, Naval Postgraduate School (1979).

S. D. Billings, R. K. Beatson, G. N. Newsam, Interpolation of geophysical data using continuous global surfaces, Geophysics 67 (6) (2002) 1810-1822. doi:10.1190/1.1527081.

R. L. Hardy, Multiquadratic equations of topography and other irregular surfaces [J], Journal of geophysical research 76 (8) (1971) 1905-1915. doi:10.1029/JB076i008p01905.

R. W. Clough, Finite element stiffness matrices for analysis of plates in bending, Proceedings of Conference on Matrix Methods in Structural Analysis (1965) 515-545.

R. Barnhill, Representation and approximation of surface, J.R. Rice,ed. Mathematical Software III (1977) 68-119. doi: 10.1016/B978-0-12-587260-7.50008-X.

A. Goshtasby, Piecewise cubic mapping functions for image registra-tion, Pattern Recognition 20 (5) (1987) 525-533. doi:10.1016/ 0031-3203(87)90079-3.

J. Nam, A. H. Tewfik, Detection of gradual transitions in video se-quences using B-spline interpolation, IEEE Transactions on Multimedia 7 (4) (2005) 667-679. doi:10.1109/TMM.2005.843362.

B. Csébfalvi, Cosine-weighted b-spline interpolation: A fast and high-quality reconstruction scheme for the body-centered cubic lattice, IEEE Transactions on Visualization and Computer Graphics 19 (9) (2013) 1455-1466. doi:10.1109/TVCG.2013.7.

S. Chen, X. Hong, Y. Gong, C. J. Harris, Digital predistorter design using b-spline neural network and inverse of de boor algorithm, IEEE Transactions on Circuits and Systems I: Regular Papers 60 (6) (2013) 1584-1594. doi:10.1109/TCSI.2012.2226514.

J. Huang, Stereo matching based on segmented b-spline surface fitting and accelerated region belief propagation, IET Computer Vision 9 (4) (2015) 456-466. doi:10.1049/iet-cvi.2014.0166.

N. Almeida, D. Friboulet, S. Sarvari, O. Bernard, D. Barbosa, E. Samset, J. D'hooge, Left-atrial segmentation from 3d ultrasound using b-spline explicit active surfaces with scale uncoupling., IEEE transactions on ultrasonics, ferroelectrics, and frequency control 63 (2) (2016) 212-221. doi:10.1109/TUFFC.2015.2507638.

F. B. Hildebrand, Lagrange's interpolation formula, in: Introduction to Numerical Analysis: 2Nd Edition, Dover Publications, Inc., 1987, pp. 81-85.

J. F. Epperson, On the runge example, The American Mathematical Monthly 94 (4) (1987) 329-341. doi:10.2307/2323093.

S. Lee, G. Wolberg, S. Y. Shin, Scattered data interpolation with multilevel B-splines, IEEE Trans on Visualization and Computer Graphics 3 (3) (1997) 228-244. doi:10.1109/2945.620490.

D. Qi, Matrix representation and estimations of remainder term of many-knot splines interpolation curves and surfaces [J], Computational Mathematics 4 (3) (1982) 244-252.

D. Qi, H. Li, Many-knot spline technique for approximation of data, Science in China Series E: Technological Sciences 42 (4) (1999) 383-387. doi:10.1007/BF02916747.

D. Qi, H. Li, W. Ding, Many-knot splines interpolation and multiscale refinement algorithm [J], J. of Image and Graphics 2 (10) (1997) 701-706. doi:10.11834/jig.1997010218.

G. Nielson, Scattered data modeling, IEEE Computer Graphics and Applications 13 (1) (1993) 60-70. doi:10.1109/38.180119.

510 overlapping control points

520 proximity data set

600 ⟶

---
Algorithm 1

1: *Input : scattered data $V = \{(x_c, y_c, z_c)\}$*
2: *Output : control lattice $R = \{r_{ij}\}$*
3: for all $i, j$ do let $\delta_{ij} = 0$ and $\varpi_{ij} = 0$ do
4:  for each point $(x_c, y_c, z_c)$ in $V$ do
5:   *let $i = \lfloor x_c \rfloor$, and $j = \lfloor y_c \rfloor$*
6:   *let $u = x_c - \lfloor x_c \rfloor$ and $v = y_c - \lfloor y_c \rfloor$*
7:   *compute $\omega_{kl}$ and $\sum_{a=-2}^{3}\sum_{b=-2}^{3} \omega_{ab}^2$*
8:   for $k, l = -2, -1, 0, 1, 2, 3$ do
9:    *compute $r_{kl}$ with(3)*
10:   *add $\omega_{kl}^2 r_{kl}$ to $\delta_{(i+k)(j+l)}$*
11:   *add $\omega_{kl}^2$ to $\varpi_{(i+k)(j+l)}$*
12:   end for
13:  end for
14: end for
15: for all $i, j$ do
16:  if $\varpi_{ij} \neq 0$ then
17:   *compute $r_{ij} = \delta_{ij}/\varpi_{ij}$*
18:  else
19:   *let $r_{ij} = 0$*
20:  end if
21: end for

---

Figure 6 original data $m = n = 8$ $m = n = 4$ $m = n = 16$

900 ↘

---
Algorithm 2

1: *Input : scattered data* $V = \{(x_c, y_c, z_c)\}$
2: *Output : a control lattice hierarchy* $R_0, R_1, \cdots, R_h$
3: *let* $k = 0$
4: while $k \leq h$ do
5:     *let* $V_k = \{(x_c, y_c, \Delta^k z_c)\}$
6:     *compute* $R_k$ *from* $V_k$ *by the MK splines*
7:        *approximation algorithm*
8:     *compute* $\Delta^{k+1} z_c = \Delta^k z_c - f_k(x_c, y_c)$
9:     *let* $k = k + 1$
10: end while
---

Figure 9 original data $m_0 = n_0 = 1, m_h = n_h = 32$ $m_0 = n_0 = 8, m_h = n_h = 32$ $m_0 = n_0 = 1, m_h = n_h = 8$ $f_1(x, y)$ $f_2(x, y)$ $f_3(x, y)$ $f_4(x, y)$ $f_5(x, y)$

M100

M500

L160

C160

Table.1  Results of RMS based on $f_1$

1410 →

| | $f_1$ | | |
|---|---|---|---|
| | B | C | M |
| M100 | 0.0941 | 0.0598 | 0.0291 |
| M500 | 0.0692 | 0.0154 | 0.0053 |
| L160 | 0.0778 | 0.0213 | 0.0119 |
| C160 | 0.2767 | 0.1826 | 0.2551 |

Figure 14A

Table.2  Results of RMS based on $f_2$

1420 →

| | $f_2$ | | |
|---|---|---|---|
| | B | C | M |
| M100 | 0.0236 | 0.0150 | 0.0103 |
| M500 | 0.0167 | 0.0038 | 0.0024 |
| L160 | 0.0202 | 0.0209 | 0.0063 |
| C160 | 0.0351 | 0.0112 | 0.0200 |

Figure 14B

Table.3  Results of RMS based on $f_3$

1430 →

| | $f_3$ | | |
|---|---|---|---|
| | B | C | M |
| M100 | 0.0350 | 0.0126 | 0.0103 |
| M500 | 0.0237 | 0.0081 | 0.0025 |
| L160 | 0.0290 | 0.0128 | 0.0035 |
| C160 | 0.0406 | 0.0291 | 0.0236 |

Figure 14C

Table.4  Results of RMS based on $f_4$

1440 →

| | $f_4$ | | |
|---|---|---|---|
| | B | C | M |
| M100 | 0.0291 | 0.0089 | 0.0072 |
| M500 | 0.0204 | 0.0042 | 0.0019 |
| L160 | 0.0260 | 0.0121 | 0.0054 |
| C160 | 0.0483 | 0.0414 | 0.0263 |

Figure 14D

Table.5  Results of RMS based on $f_5$

1450 →

| | $f_5$ | | |
|---|---|---|---|
| | B | C | M |
| M100 | 0.0384 | 0.0194 | 0.0063 |
| M500 | 0.0313 | 0.0099 | 0.0020 |
| L160 | 0.0350 | 0.0173 | 0.0046 |
| C160 | 0.0553 | 0.0470 | 0.0413 |

Figure 14E

COMPUTER SYSTEM THAT EXECUTES HIERARCHICAL MK SPLINES SCHEME FOR SCATTERED DATA INTERPOLATION

FIELD OF THE INVENTION

The invention is directed to a computer system that executes hierarchical many-knot (MK) splines scheme for scattered data interpolation.

BACKGROUND

Scattered data interpolation requires fitting of a smooth function or surface through a set of non-uniformly distributed data points. Inexplicit interpolation methods need to solve systems of equations. A widely used explicit interpolation method is Lagrange's polynomial interpolation, but oscillation at the edges of an interval that occurs when using Lagrange's polynomial interpolation with polynomials of high degree.

A new local explicit method for large scale scattered data approximation and interpolation that minimizes approximation error and processing time and transmits the information of scattered data to all positions in the domain smoothly will assist in advancing technological needs and solving technological problems.

BRIEF DESCRIPTION OF THE DRAWINGS

FIG. 6 shows a pseudo code that outlines MK splines approximation algorithm in accordance with an example embodiment.

FIG. 9 shows a pseudo code that outlines the basic algorithm for hierarchical MK splines approximation in accordance with an example embodiment.

FIGS. 14A-14E show Tables 1410, 1420, 1430, 1440, 1450 respectively which provide results of RMS error based on test functions $f_1$, $f_2$, $f_3$, $f_4$, $f_5$ for multilevel B-splines interpolation method (B), minimum curvature interpolation method (C) and hierarchical MK splines approximation (M) in accordance with an example embodiment.

SUMMARY OF THE INVENTION

Figure 1A:
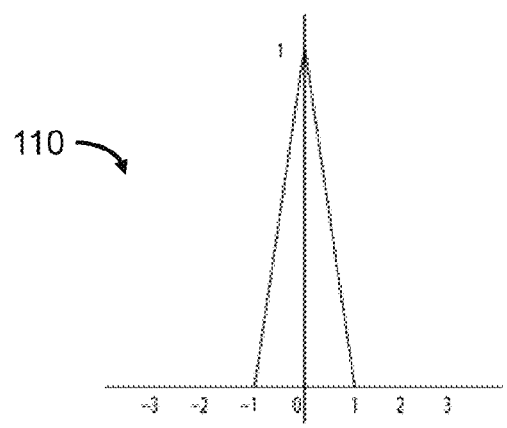
FIG. 1A shows a graph of a linear MK splines basis function in accordance with an example embodiment.

One example embodiment is a computer system that executes hierarchical many-knot (MK) splines for scattered data interpolation and approximation.

In one example embodiment the computer system executes a method that constructs an image by generating a final approximation function f that approximates a scattered data set V. The method includes setting a hierarchy of control lattice from coarsest to densest $R_0, R_1, \ldots, R_h$; executing MK splines approximation to V with the coarsest control lattice $R_0$ to obtain approximation function $f_0$ that is the most smooth approximation function of V; calculating a first deviation $\Delta^1 z_c$ of $f_0$ for each point in V to generate a deviation data set $V_1$; performing iteration steps for the control lattices from $R_1$ to $R_h$ to generate a sequence of approximation functions from $f_1$ to $f_h$, the iteration steps include: for a level k of the hierarchy of control lattice, summing $f_0$ to $f_{k-1}$ to yield a smaller deviation $\Delta^k z_c$ for each point in V to generate a deviation data set $V_k$ and executing the MK splines approximation with the control lattice $R_k$ to the deviation data set $V_k$ to obtain approximation function $f_k$; generating the final approximation function f by summing $f_0$ to $f_h$ to construct an interpolated surface; and constructing the image from the interpolated surface.

Other example embodiments are discussed herein.

DETAILED DESCRIPTION

Examples embodiments relate to apparatus and methods that construct or reconstruct images by applying MK splines approximation with a hierarchy of control lattices for a scattered data set, thus provide a fast approximation and interpolation for large-scaled scattered multivariate data.

An example embodiment includes a method executed by a computer system to construct an image by generating a sequence of approximation functions whose sum approaches desired interpolated surface that approximates a scattered data set V based on applying MK splines approximation with a hierarchy of control lattice from coarsest to densest $R_0, R_1, \ldots, R_h$. In the sequence, an approximation function from the coarsest control lattice provides an initial estimate, which is further refined in accuracy by approximation functions derived at finer levels.

In one example embodiment, a computer system includes at least one processor and a computer-readable medium having stored therein instructions that when executed cause the at least one processor to receive data points of a scattered data set V of an image, to set a hierarchy of control lattice from coarsest to densest $R_0, R_1, \ldots, R_h$, to generate a sequence of approximation functions whose sum approaches desired interpolated surface that approximates a scattered data set V based on applying MK splines approximation with the hierarchy of control lattice, and to display the reconstructed image from the computer.

Another embodiment realizes large performance gains by applying MK splines refinement to reduce the sum of the MK splines approximation functions into one equivalent MK splines approximation function.

Many-knot (MK) splines is a local explicit method for an approximation of real-valued functions. MK splines comes from a linear combination of B-splines. Therefore, the MK splines inherit properties from B-splines, such as compact support. Moreover, the MK splines interpolating curves are a kind of splines curves that passes through every interpolating point on the curves. The MK splines interpolating surface also passes through every interpolating point on the surfaces.

The k-th MK splines express as:

$$L_k(x) = \sum_{i=0}^{k-1} a_i \mu^{h_i} \Omega_k(t)$$

where $a_i (i=0, 1, \ldots, k-1)$ is undetermined constants, $h_0=0, 0<h_1<h_2<\ldots<(k+1)/2$, $\Omega_k(t)$ is k-th B splines basis function, $\Omega_k(t)$ has the following form:

$$\Omega_k(x) = \bar{\Delta} \int_{-\infty}^x \Omega_{k-1}(x) dx$$
$$= \bar{\Delta}^{k+1} x_+^k$$
$$= \frac{1}{k!} \sum_{i=0}^{k+1} (-1)^j \binom{k+1}{j} \left(x + \frac{k+1}{2} - j\right)_+^k,$$

$k = 0, 1, 2, 3, \ldots$ $(\cdot)_+ = \max\{\cdot, 0\}$

μ is an average operator which satisfies:

$\mu^\xi f(x) \equiv \frac{1}{2}(f(x+\xi)+f(x-\xi))$

As definition, we have $L_0(t)=\Omega_0(t)$, $L_1(t)=\Omega_1(t)$. When k>1, in order to construct $L_k(t)$, let $L_k(0)=1$, $L_k(i)=0$, m≠0, where i is a non-zero integer. Then we can obtain the linear equations about $a_i (i=0, 1, \ldots, k-1)$. From the linear equations, the obtained $L_k(t)$ is the k-th MK splines basis functions.

When k=2, let $h_0=0$, $h_1=1$, we can obtain $L_2(t)$.

$L_2(t)=(2I-\mu^{1/2})\Omega_2(t), k=2$

When k=3, let $h_0=0$, $h_1=\frac{1}{2}$, $h_2=1$, we can obtain $L_3(t)$.

$L_3(t)=(10/3I-8/3\mu^{1/2}+\frac{1}{3}\mu)\Omega_3(t), k=3$ where I is the unit operator.

Figure 1B:
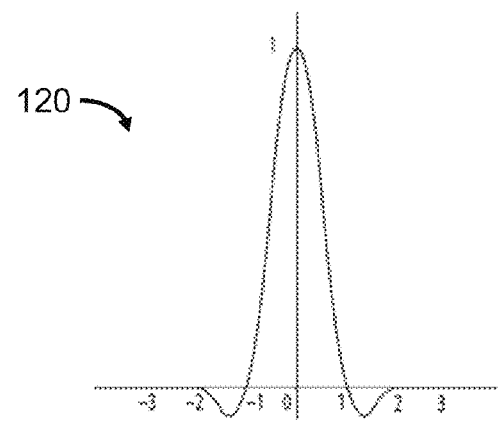
FIG. 1B shows a graph of a quadratic MK splines basis function in accordance with an example embodiment.
Figure 1C:
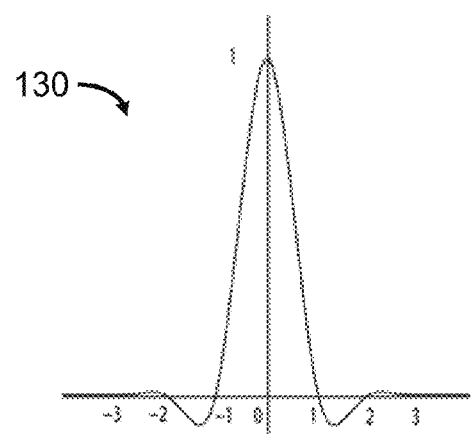
FIG. 1C shows a graph of a cubic MK splines basis function in accordance with an example embodiment.

Graph 110 in FIG. 1A shows the linear MK splines basis function, i.e. when k=1. Graph 120 in FIG. 1B shows the quadratic MK splines basis function, i.e. when k=2. Graph 130 in FIG. 1C shows the cubic MK splines basis function, i.e. when k=3.

Figure 2A:
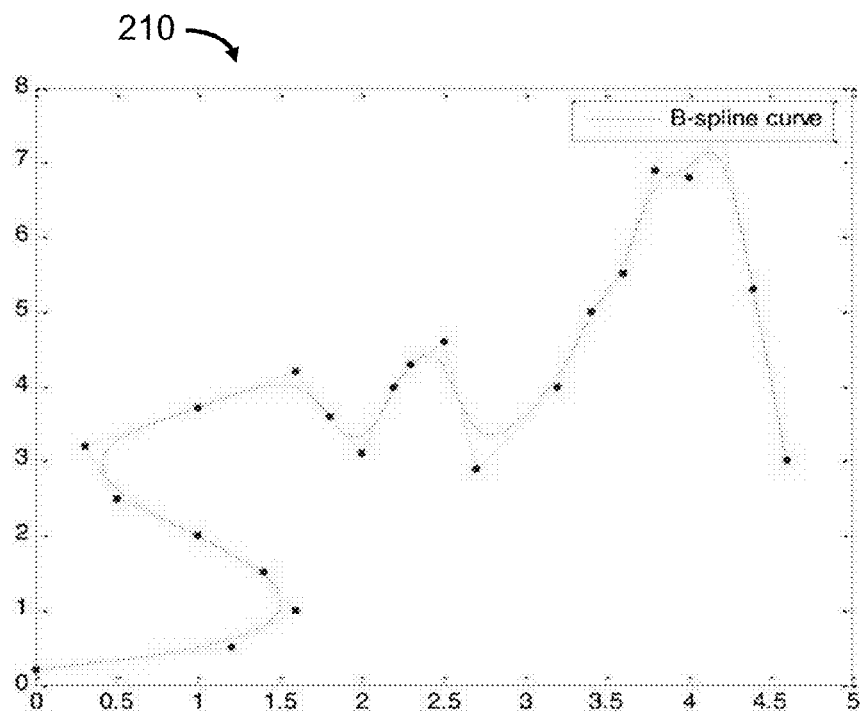
FIG. 2A shows a graph of a B-splines fitting curve in accordance with an example embodiment.
Figure 2B:
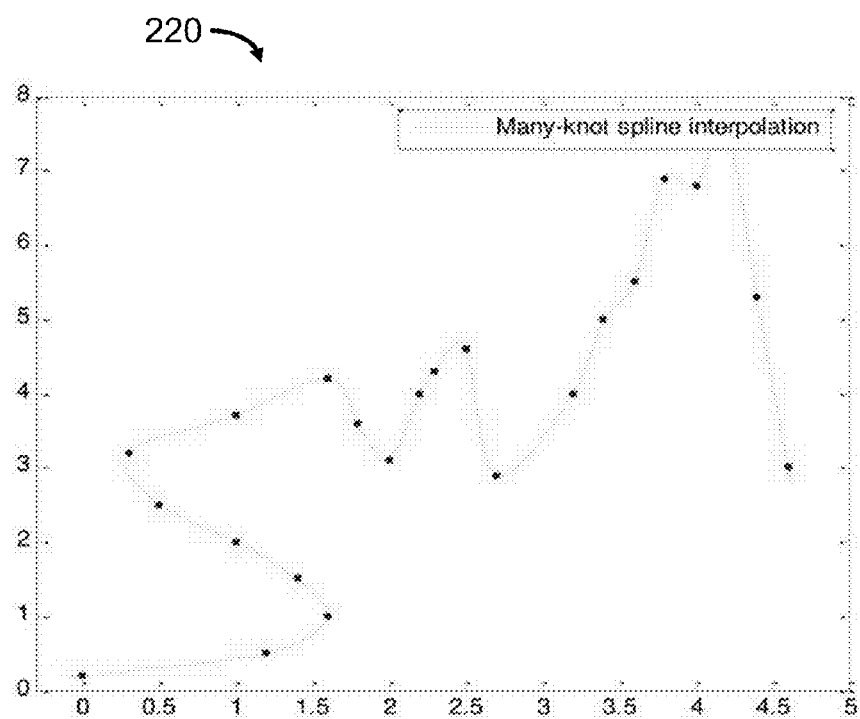
FIG. 2B shows a graph of a MK splines interpolation curve in accordance with an example embodiment.

Graph 210 in FIG. 2A shows a B-splines fitting curve. Graph 220 in FIG. 2B shows a MK splines interpolation curve. Both the B-splines fitting curve and MK splines interpolation curve have locality, but B-spline fitting curve cannot pass all the data points.

Figure 3:
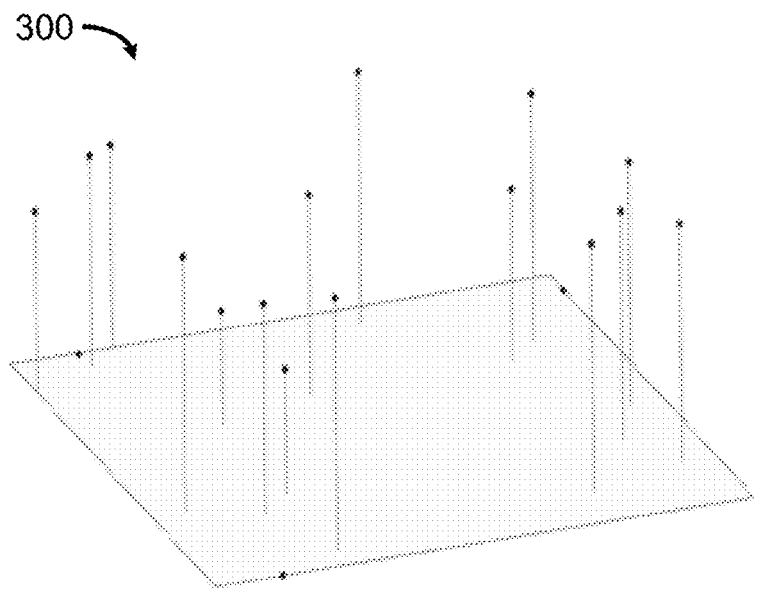
FIG. 3 shows scattered data points in accordance with an example embodiment.

FIG. 3 shows scattered data points 300 which is a scattered data set $V=\{(x_c,y_c,z_c)\}$ in 3D space, where $(x_c,y_c)$ is a point in domain $D=\{(x,y)|0 \leq x<m, 0 \leq y<n\}$. To approximate the scattered data V, approximation function f is formulated as a MK splines approximation function, which is defined by a control lattice R overlaid on domain D.

Figure 4:
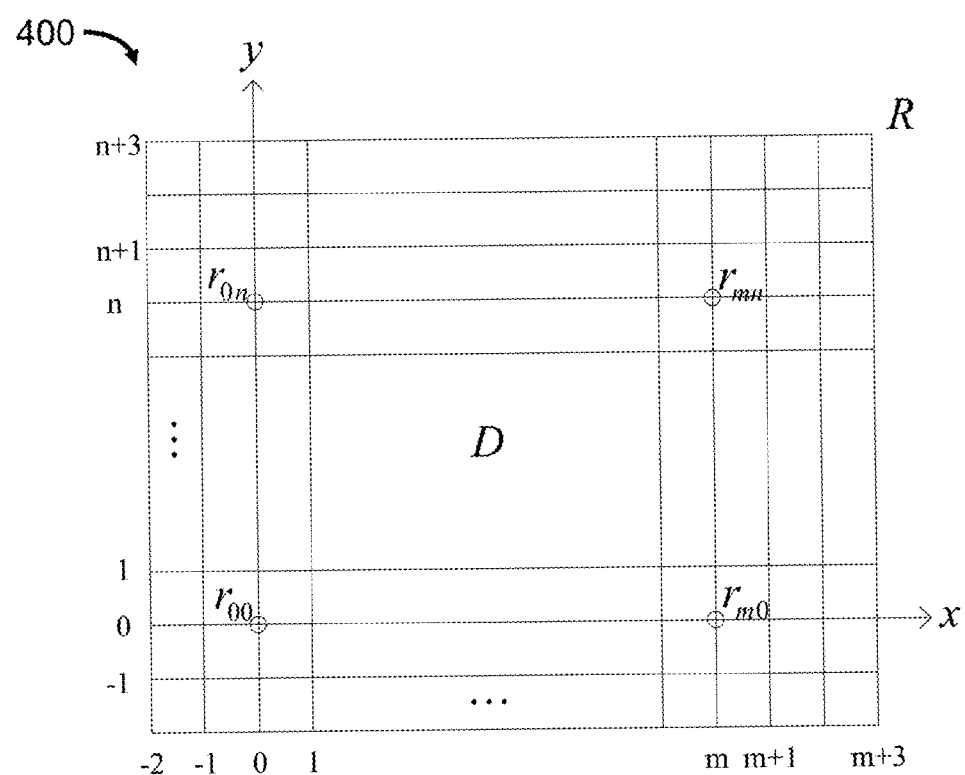
FIG. 4 shows a configuration of control lattice in accordance with an example embodiment.

FIG. 4 shows the configuration of control lattice 400, where R is considered as a (m+5)×(n+5) lattice spans the integer grid in D. The lattice sizes affect the shape of approximation function.

Assume the value of the ij-th control point on lattice R as $r_{ij}$. The approximation function f can be defined by these control points as:

$$f(x, y) = \sum_{k=-2}^{3} \sum_{l=-2}^{3} L_3(u-k)L_3(v-l) \times r_{(i+k)(j+l)} \quad (1)$$

where $i=\lfloor x \rfloor$, $j=\lfloor y \rfloor$, $u=x-\lfloor x \rfloor$ and $v=y-\lfloor y \rfloor$. $L_3(t)$ is cubic MK splines basis function defined as:

$$L_3(t) = \begin{cases} 1 - \frac{5}{2}|t|^2 + \frac{14}{9}|t|^3 & 0 \le |t| < \frac{1}{2} \\ \frac{19}{18} - \frac{1}{3}|t| - \frac{11}{6}|t|^2 + \frac{10}{9}|t|^3 & \frac{1}{2} \le |t| < 1 \\ \frac{37}{12} - \frac{77}{12}|t| + \frac{17}{4}|t|^2 - \frac{11}{12}|t|^3 & 1 \le |t| < \frac{3}{2} \\ \frac{5}{6} - \frac{23}{12}|t| + \frac{5}{4}|t|^2 - \frac{1}{4}|t|^3 & \frac{3}{2} \le |t| < 2 \\ -\frac{49}{18} + \frac{41}{12}|t| - \frac{17}{12}|t|^2 + \frac{7}{36}|t|^3 & 2 \le |t| < \frac{5}{2} \\ \frac{3}{4} - \frac{3}{4}|t| + \frac{1}{4}|t|^2 - \frac{1}{36}|t|^3 & \frac{5}{2} \le |t| < 3 \\ 0 & 3 \le |t| \end{cases}$$

It evaluates the contribution of each control point to f(x,y) based on its distance to (x,y). With formula (1), the problem of deriving function f which best approximates the data set in V, can be changed to solving for the control points in R. Then function f can be obtained by formula (1).

From formula (1), the function value $f(x_c, y_c)$ is determined by the thirty six control points in the neighborhood of $(x_c, y_c)$. Support that $0 \le x_c, y_c < 1$ and the control points to determine the value of f at $(x_c, y_c)$ as $r_{kl}$ (k, l=−2, −1, 0, 1, 2, 3). Thus, for every scattered data point, since $f(x_c, y_c) = z_c$, the control points $r_{kl}$ satisfy:

$$z_c = \sum_{k=-2}^{3} \sum_{l=-2}^{3} \omega_{kl} r_{kl} \quad (2)$$

where $\omega_{kl} = L_3(u-k)L_3(v-l)$ and $u=x_c$, $v=y_c$.

There are many values of $r_{kl}$ that satisfy formula (2). One that minimizes the deviation of f from zero over the domain D is chosen. This selection can be determined by the least-squared sense that minimizes $\Sigma_{k=-2}^{3}\Sigma_{k=-2}^{3} r_{kl}^2$. $r_{kl}$ can be obtained by deriving the solution:

$$r_{kl} = \frac{\omega_{kl} z_c}{\sum_{a=-2}^{3} \sum_{b=-2}^{3} \omega_{ab}^2} \quad (3)$$

For each data point, formula (3) can be used to determine a set of 6×6 control points in its neighborhood. These neighborhoods may overlap if the data points are too close.

Figure 5A:
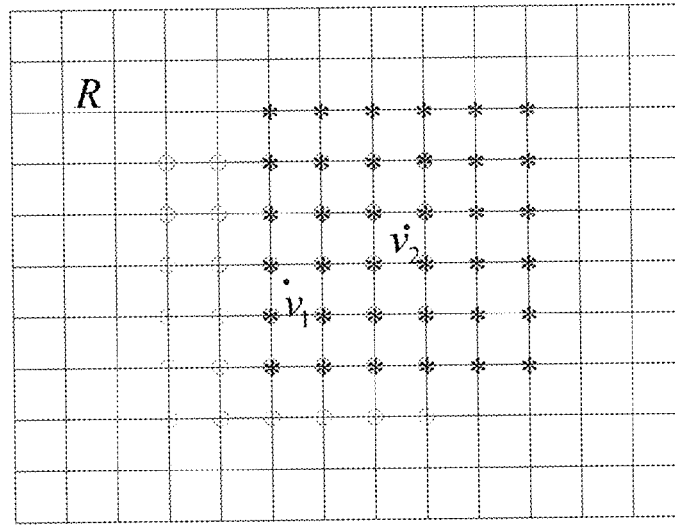
FIG. 5A shows a graph of positional relationship between data and control points in accordance with an example embodiment.

Graph 510 in FIG. 5A shows positional relationship between data and control points, in which the control points of data points $v_1$ and $v_2$ are overlapping. They may assign different values to several shared control points.

Figure 5B:
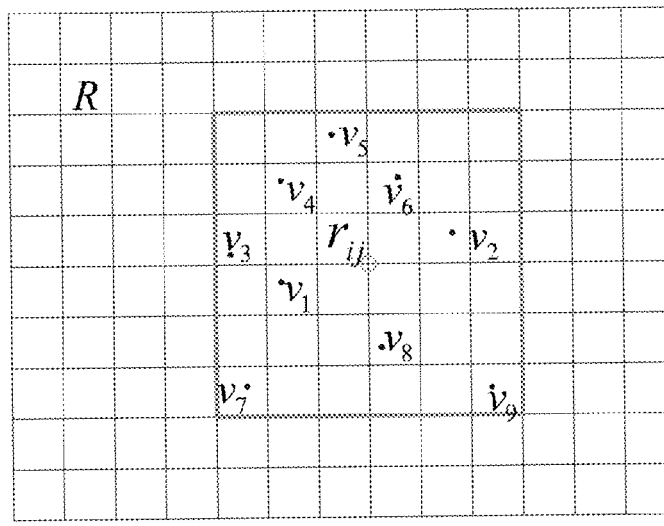
FIG. 5B shows a graph of positional relationship between data and control points in accordance with an example embodiment.

Graph 520 in FIG. 5B shows positional relationship between data and control points. Multiple assignments to control point r are resolved by considering the data points in its 6×6 neighborhood. Only these points may influence the value of r by formula (3). This set of points is the proximity data set of r.

Let $V_{ij}$ be the proximity data set of control point $r_{ij}$ such that $V_{ij} = \{(x_c, y_c, z_c) \in V | i-2 \le x_c < i+3, j-2 \le y_c < j+3\}$. For each point $(x_c, y_c, z_c)$ in $V_{ij}$, formula (3) gives $r_{ij}$ a different value $r_c$:

$$r_c = \frac{\omega_c z_c}{\sum_{a=-2}^{3} \sum_{b=-2}^{3} \omega_{ab}^2} \quad (4)$$

where $\omega_c = \omega_{kl} = L_3(u-k)L_3(v-l)$, $k=i-\lfloor x_c \rfloor$, $l=j-\lfloor y_c \rfloor$, $u=x_c-\lfloor x_c \rfloor$ and $v=y_c-\lfloor y_c \rfloor$.

To tradeoff among the value, $r_{ij}$ is chosen to minimize error $e(r_{ij}) = \Sigma_c(\omega_c r_{ij} - \omega_c r_c)^2$. The term $(\omega_c r_{ij} - \omega_c r_c)$ is the difference between the real and expected contributions of $r_{ij}$ to function f at $(x_c, y_c)$. By differentiating the error $e(r_{ij})$ with respect to $r_{ij}$, formula (5) is resulted:

$$r_{ij} = \frac{\sum_c \omega_c^2 r_c}{\sum_c \omega_c^2} \quad (5)$$

The points in the proximity data set $V_{ij}$ have an influence on control point $r_{ij}$. When $V_{ij}$ includes several points, formula (5) provides a least-squared solution to $r_{ij}$ which minimizes a local approximation error. When $V_{ij}$ consists of only one point, formula (5) reduces to formula (3), leaving no approximation error. When $V_{ij}$ is empty, however, $r_{ij}$ has no influence on $f(x_c, y_c)$ for any data point $(x_c, y_c, z_c)$ in V. This implies that $r_{ij}$ may be assigned any arbitrary value, such as zero or the average of the $z_c$'s, without affecting the approximation error. In that case, $r_{ij}$ is assigned zero to make function f tend to zero in its neighborhood.

Control lattice R from the data points in V can be determined by formula (5). Since each data point in V influences a set of 6×6 neighboring control points in R, in another word, this data point is the proximity data of those 6×6 control points. In this way, the numerator and denominator of formula (5) can be efficiently accumulated for each control point by considering each data point in turn. Then the value of a control point is obtained by division if the denominator is not zero, rather than identifying the proximity data set for each control point and determining the control point from the proximity data set. A null denominator occurs only when a control point has an empty proximity data set. In that case, the control point is assigned zero.

FIG. 6 shows the pseudo code 600 that outlines this MK splines approximation algorithm.

The time of the MK approximation is O(p+mn), where p is the number of data points, and (m+5)×(n+5) is the size of the control lattice.

Figure 7A:
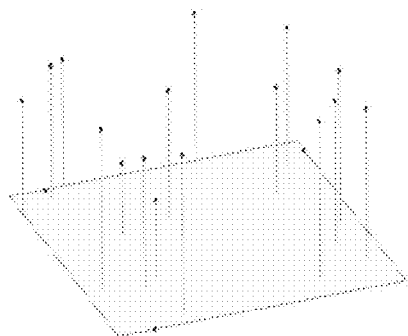
FIG. 7A shows an original data set in accordance with an example embodiment.
Figure 7B:
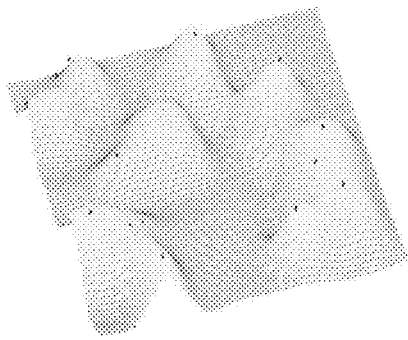
FIG. 7B shows a graph depicting approximation function f derived by the MK splines approximation for $m=n=8$ in accordance with an example embodiment.

FIG. 7A shows original data set V 710, and FIG. 7B shows graph 720 depicting approximation function f derived by the MK splines approximation for m=n=8. f nicely approximates V at densely distributed data points and interpolates V at isolated points.

Figure 7C:
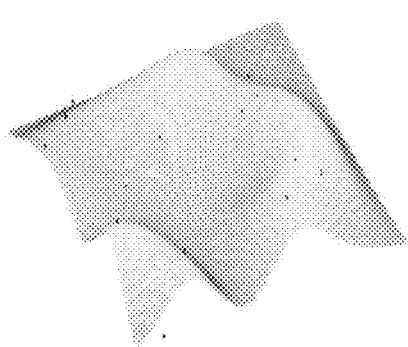
FIG. 7C shows a graph depicting approximation function f derived by the MK splines approximation for $m=n=4$ in accordance with an example embodiment.
Figure 7D:
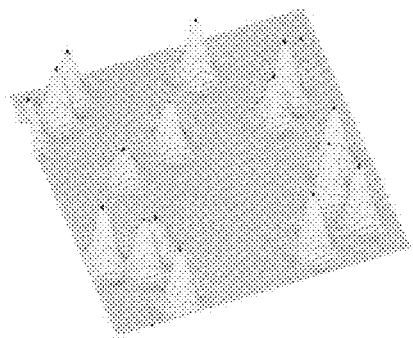
FIG. 7D shows a graph depicting approximation function f derived by the MK splines approximation for $m=n=16$ in accordance with an example embodiment.

The density of control lattice R overlaid on domain D directly affects the shape of approximation function f. As R becomes coarser, the proximity data set of each control point covers a larger number of data points in V. This causes many data point to be blended together to yield a smoother shape for f at the expense of approximation accuracy. However, as R becomes finer, the influence of a data point is limited to smaller neighborhoods. This enables V to be more closely approximated, although f tends to contain local peaks near the data point. These characteristics are shown in the graphs 730 and 740 in FIGS. 7C and 7D, where m=n=4 and m=n=16, respectively.

The MK splines approximation can effectively generate an approximation function of data set V. However, a tradeoff exists between the shape smoothness and accuracy. As shown in the graphs 720, 730 and 740 in FIGS. 7B, 7C and 7D respectively: coarser control points generate a smoother shape function but derivate a larger deviation of the data set V; when R becomes finer, data set V is more closely approximated, but the approximation function f tends to contain local peaks near the data point.

An example embodiment circumvents this tradeoff by generating a final approximation function f from a sequence of approximation functions whose sum approaches the desired approximate function and simultaneously achieves a smooth shape while closely approximates the given data V.

Figure 8:
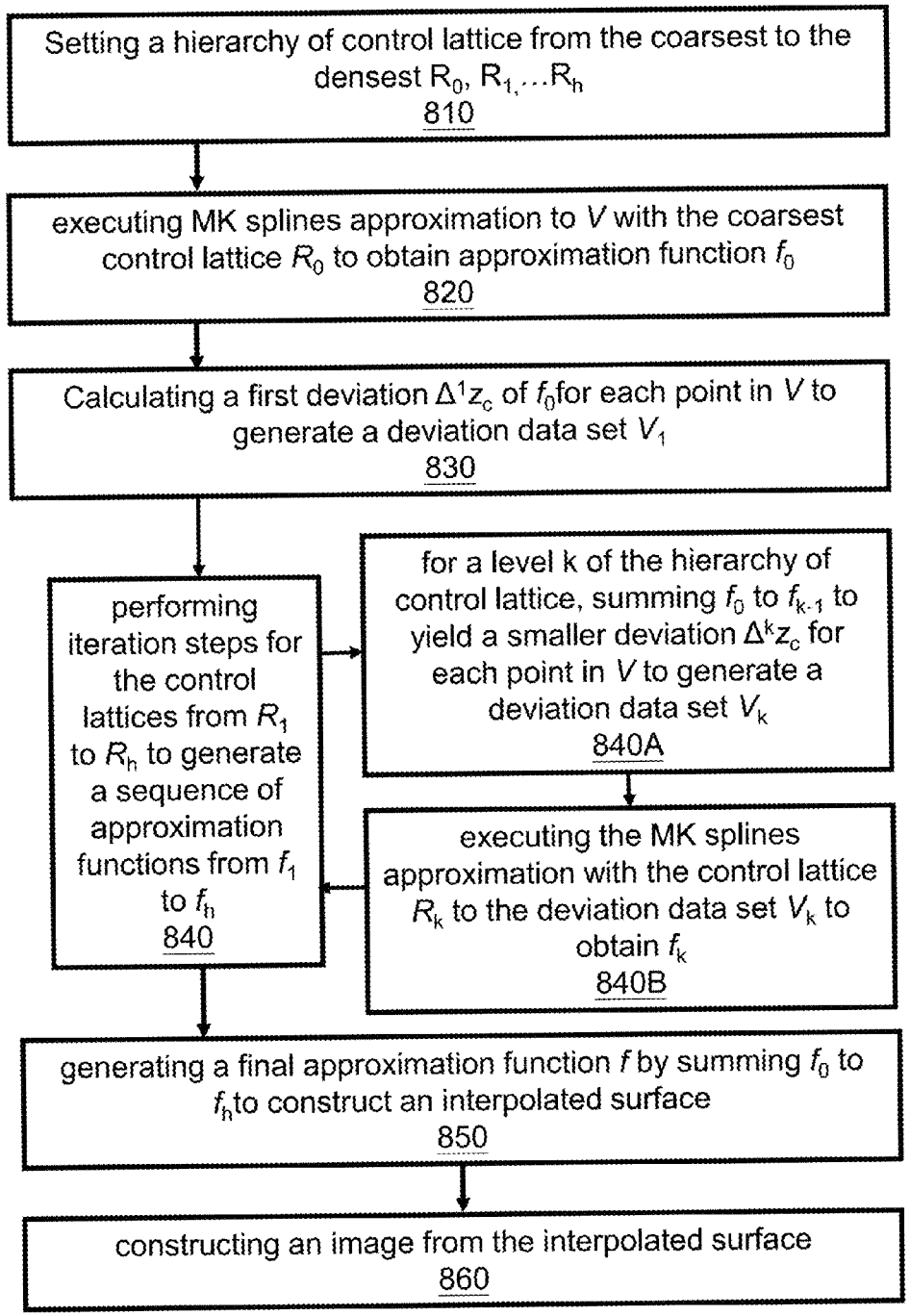
FIG. 8 shows a method executed by computer system to construct an image using hierarchical MK splines approximation for a scattered data set in accordance with an example embodiment.

FIG. 8 shows a method executed by computer system to construct an image using hierarchical MK splines approximation. The hierarchical MK splines approximation generates the final approximation function f that approximates a scattered data set V.

Block 810 illustrates setting a hierarchy of control lattice $R_0, R_1, \ldots, R_h$, wherein $R_0$ is the coarsest control lattice and $R_h$ is the densest control lattice defined by the user, $R_k$ is the control lattice at level k of the hierarchy of control lattice, the spacing between the control points in the control lattice is smaller from one lattice to the next. In the sequence of approximation functions, a function from a coarse lattice provides a rough approximation, which is further refined in accuracy by functions derived from finer lattices.

By way of example, the spacing between control points for $R_0$ is given and that the spacing is halved from one lattice to the next. Therefore, if $R_k$ is a (m+5)×(n+5) lattice, the next finer lattice $R_{k+1}$ will have (2m+5)×(2n+5) control points.

Block 820 illustrates executing, by the computer system, the MK splines approximation to the scattered data set V with the coarsest control lattice $R_0$ and obtain approximation function $f_0$. The function $f_0$ is the most smooth approximation function but also leaves large discrepancies at the data points in V.

Block 830 illustrates calculating, by the computer system, a first deviation $\Delta^1 z_c = z_c - f_0(x_c, y_c)$ of $f_0$ for each point $(x_c, y_c, z_c)$ in V to generate a deviation data set $V_1 = \{(x_c, y_c, \Delta^1 z_c)\}$ which is used as the data set for the next finer control lattice $R_1$ to obtain approximate function $f_1$.

Then, the sum $f_0 - f_1$ yields a smaller deviation $\Delta^2 z_c = z_c - f_0(x_c, y_c) - f_1(x_c, y_c)$ for each point $(x_c, y_c, z_c)$ in V.

Block 840 illustrates performing, by the computer system, iteration steps of the processes illustrated in Block 840A and Block 840B from lattice $R_1$ and continues incrementally to the finest lattice $R_h$ to generate a sequence of approximation functions from $f_1$ to $f_h$.

Block 840A illustrates, for a level k of the hierarchy of control lattice, summing, by the computer system, $f_0$ to $f_{k-1}$ to yield a smaller deviation $\Delta^k z_c = z_c - \Sigma_{i=0}^{k-1} f_{k-1}(x_c, y_c) = \Delta^{k-1} z_c - f_{k-1}(x_c, y_c)$ for each point in V to generate a deviation data set $V_k = \{(x_c, y_c, \Delta k^z_c)\}$, where $\Delta^0 z_c = z_c$.

Block 840B illustrates executing, by the computer system, the MK splines approximation with the control lattice $R_k$ to the deviation data set $V_k$ to obtain approximation function $f_k$.

Block 850 illustrates generating, by the computer system, the final approximation function f by summing $f_0$ to $f_h$ to construct an interpolated surface. Only the coarsest lattice $R_0$ is applied to the original data V to derive the global shape of function f. All successively finer lattices serve to approximation and remove the residual error. In this manner, an incremental solution for function f yields a smooth and close approximation to V.

Block 860 illustrates constructing, by the computer system, an image from the interpolated surface.

FIG. 9 shows the pseudo code 900 that outlines the basic algorithm for the hierarchical MK splines approximation in accordance with an example embodiment.

Consider an example embodiment in which the number of data points in V is p and the size of finest control lattice $R_h$ is (m+5)×(n+5). The number of the control points in lattice $R_k$ is a quarter of that in the next finer lattice $R_{k+1}$. Hence, the time complexity of the hierarchical MK splines approximation is $O(p+mn)+O(p+¼mn)+ \ldots +O(p+¼^h mn)=O(hp+4/3mn)$. Since cubic MK splines is $C^2$-continuous, so the sum of function $f_k$ is $C^2$-continuous.

Figure 10A:
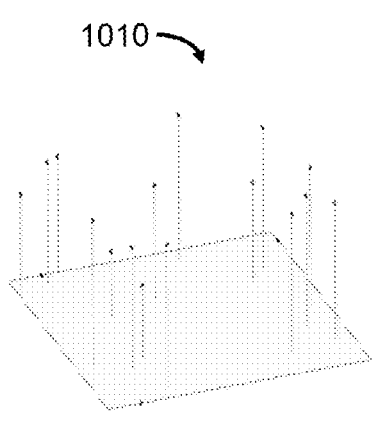
FIG. 10A shows an original data set in accordance with an example embodiment.
Figure 10B:
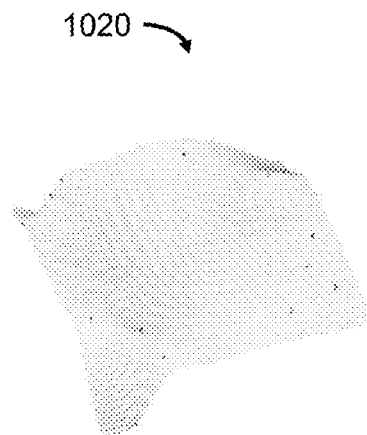
FIG. 10B shows a graph depicts approximation function f derived by hierarchical MK splines approximation for $m_0=n_0=1$ and $m_h=n_h=32$ in accordance with an example embodiment.

One example embodiment is applied to original data 1010 shown in FIG. 10A, which is the same as that in FIG. 7A. Let $(m_h+5)\times(n_h+5)$ be the size of the finest control lattice $R_h$. FIG. 10B shows graph 1020 depicts approximation function f derived by the hierarchical MK splines approximation for $m_0=n_0=1$ and $m_h=n_h=32$, indicating the example embodiment generates a much smoother and more accurate function than MK splines approximation.

In example embodiments, the density of the coarsest lattice $R_0$ determines the area of influence of a data point on approximation function f. Larger spacing between control points serve to merge the influences of data points over large areas to produce a smoother function shape. On the other hand, the density of the finest lattice $R_h$ controls the precision with which f approximates the data points. When $R_h$ is sufficiently fine compared to the data distribution, f can interpolate the data without an approximation error.

Figure 10C:
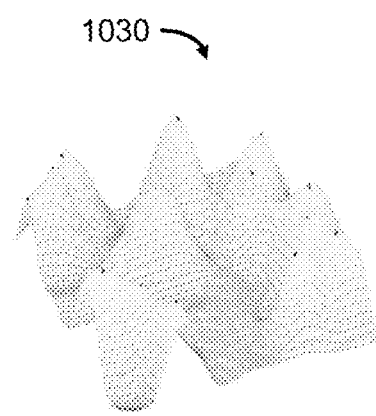
FIG. 10C shows a graph depicts approximation function f derived by hierarchical MK splines approximation for $m_0=n_0=8$ and $m_h=n_h=32$ in accordance with an example embodiment.

FIG. 10C shows graph 1030 which depicts approximation function f derived by the hierarchical MK splines approximation when $R_0$ gets finer with $m_0=n_0=8$.

Figure 10D:
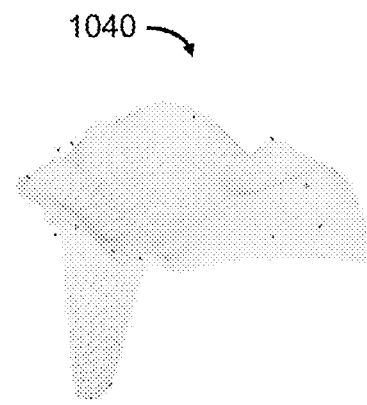
FIG. 10D shows a graph depicts approximation function f derived by hierarchical MK splines approximation for $m_0=n_0=1$ and $m_h=n_h=8$ in accordance with an example embodiment.

FIG. 10D shows graph 1040 which depicts approximation function f derived by the hierarchical MK splines approximation when $R_h$ get coarser with $m_h=n_h=8$ results in an approximation error.

Figure 11A:
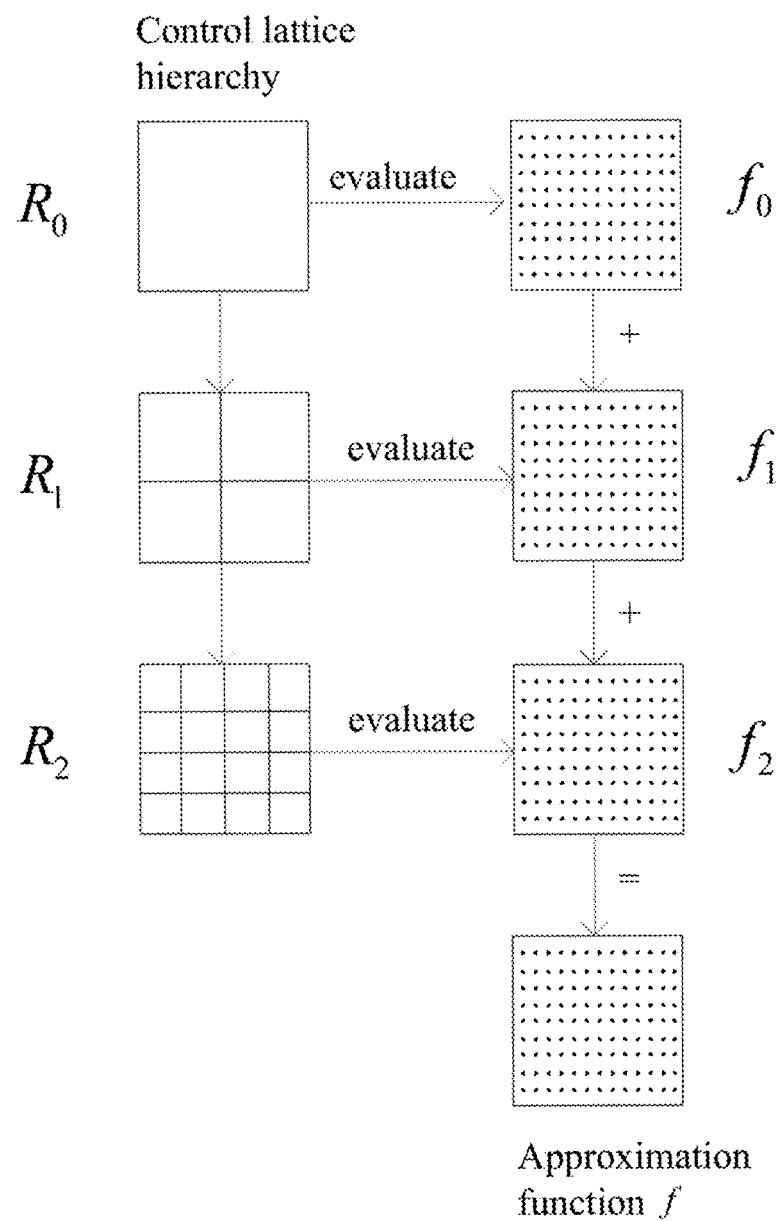
FIG. 11A shows an evaluation of final approximate function f in accordance with an example embodiment.

FIG. 11A shows the evaluation 1110 of the final approximate function f in one example embodiment. Firstly, a hierarchical control lattice $R_0, R_1, \ldots, R_h$ is generated by hierarchical MK splines approximation, and then function $f_k$ is determined from control lattice $R_k$ for each level k, at last $f_k$ is added over domain D. If f has to be evaluated at a large number of points in D, this introduces a significant overhead in computation time.

Figure 11B:
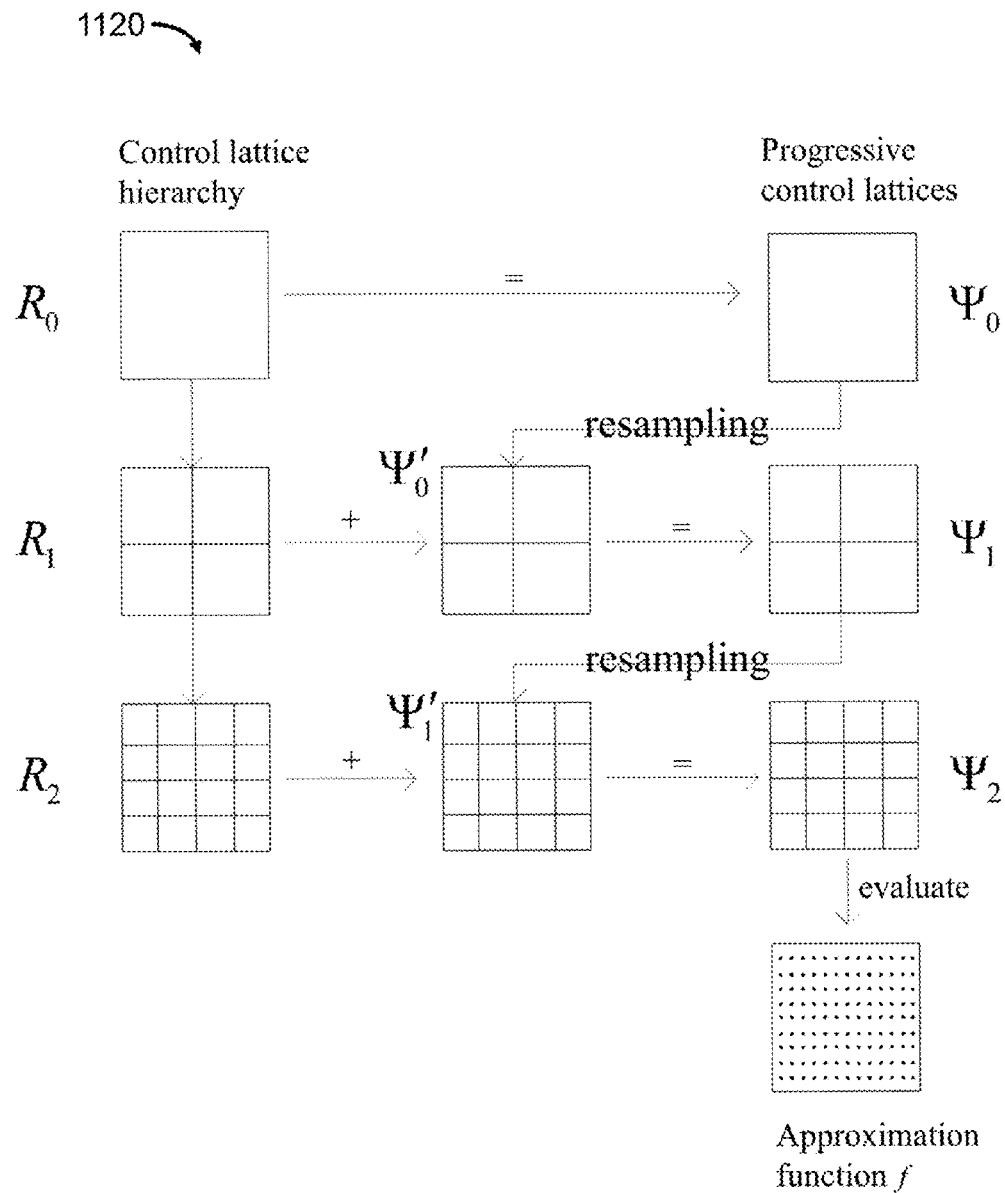
FIG. 11B shows an evaluation of final approximate function $\tilde{f}$ in accordance with an example embodiment.
Figure 12A:
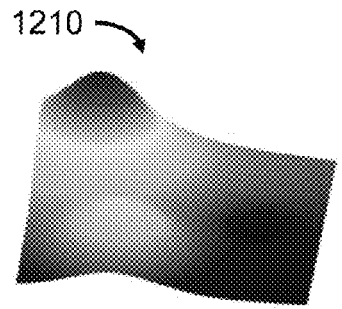
FIGS. 12A-12E show test functions used for demonstrating reconstruction accuracy in accordance with an example embodiment.
Figure 12B:
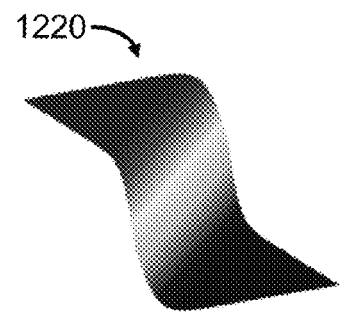
Figure 12C:
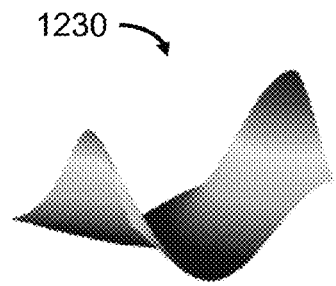
Figure 12D:
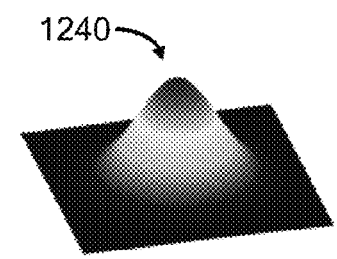
Figure 12E:
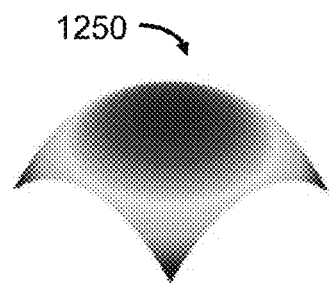
Figure 13A:
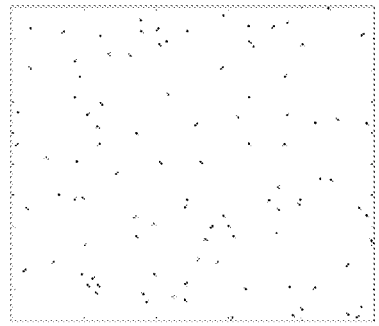
FIGS. 13A-13D show graphs depicting sampling positions for test data sets M100, M500, L160, and C160 in accordance with an example embodiment.
Figure 13B:
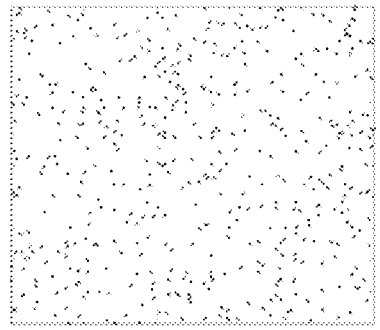
Figure 13C:
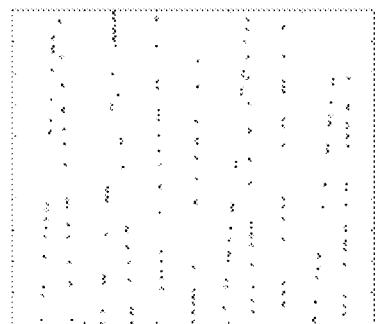
Figure 13D:
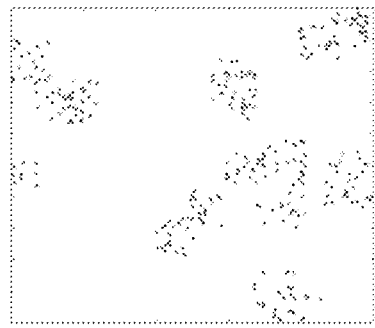

Yet another embodiment is applied by performing MK splines refinement which merges the control lattice hierarchy into $R_k$. Then, the computation of f is limited to the control points in $R_k$ rather than each level of the control lattice hierarchy. FIG. 11B shows the evaluation 1120 of the final approximate function f in this example embodiment. To consider $g_1=f_0+f_1$ which $f_0 f_1$ determined by $R_0 R_1$. Let F(R) be the MK splines approximation function generated by control lattice R, then $g_1=F(R_0)+F(R_1)$ Since the MK splines surface passes the control points, using this property one can easy resample control lattice $R'_0$ from the lattice $R_0$ at the location of control points in $R_1$. As such, $R'_0$ has the properties of $F(R'_0)=f_0$ and $|R'_0|=R_1$. Then, function $g_1$ can be expressed as $g_1=F(R'_0)+F(R_1)=F(\Psi_1)$ where $\Psi_1=R'_0+R_1$.

In general, suppose that function $g_{k-1}$ is represented by a control lattice $\Psi_{k-1}$ which $|\Psi_{k-1}|=|R_{k-1}|$, one can resample $\Psi_{k-1}$ to $\Psi'_{k-1}$ with $|\Psi'_{k-1}|=|R_k|$, and add $\Psi''_{k-1}$ to $R_k$ to derive $\Psi_k$ such that $F(\Psi_k)=g_{k-1}+F(R_k)$ and $|\Psi_k|=|R_k|$. Therefore, from $g_0=f_0$ and $\Psi_0=R_0$, a sequence of control lattices $\Psi_k$ can be computed to progressively derive the control lattice $\Psi_h$ for the final approximation function $f=g_h$.

Another example embodiment uses below functions $f_1$, $f_2$, $f_3$, $f_4$, $f_5$ to demonstrate the accuracy of reconstruction:

$$f_1(x,y) = 0.75\exp\left(-\frac{(9x-2)^2+(9y-2)^2}{4}\right) + 0.75\exp\left(-\frac{(9x+1)^2}{49} - \frac{(9y+1)}{10}\right) +$$

$$0.5\exp\left(-\frac{(9x-7)^2+(9y-3)^2}{4}\right) - 0.2\exp(-(9x-4)^2-(9y-7)^2)$$

$$f_2(x,y) = \frac{(\tanh(9-9x-9y)+1)}{9}$$

$$f_3(x,y) = \frac{(1.25+\cos(5.4y))}{(6+6(3x-1)^2)}$$

$$f_4(x,y) = \exp\left(-\frac{81}{4}(x-0.5)^2+(y-0.5)^2\right)/3$$

$$f_5(x,y) = \frac{\sqrt{64-81(x-0.5)^2+(y-0.5)^2}}{9} - 0.5$$

FIGS. 12A-12E show the test functions $f_1$, $f_2$, $f_3$, $f_4$, $f_5$ in graphs 1210, 1220, 1230, 1240 and 1250 respectively in domain $\{(x,y)|0\leq x\leq 1, 0\leq y\leq 1\}$. Firstly, data points are sampled from a given test function $f(x,y)$. Then, the hierarchical MK splines approximation is applied to procure an approximation function z. The root mean square error is used to measure the difference between z and the test function.

For each test function, four data sets M100, M500, L160, and C160 are used. FIGS. 13A-13D show graphs 1310, 1320, 1330, 1340 respectively depicting the sampling positions for the data sets. M100 and M500 consist 100 and 500 points which were randomly sampled. L160 consists of 220 data points sampled from 11 lines, which is similar to sampling from edges of an object. In C160, there are 12 clusters, each cluster has 10 to 60 points.

The root mean square (RMS) error between the test function and approximation function z was measured on a dense grid over domain. RMS error measures how much error there is between a predicted value and an observed value. The smaller RMS error, the better.

$$\text{RMS} = \sqrt{\frac{\sum_{i=1}^{M}\sum_{j=1}^{N}(f(x_i,y_j)-z(x_i,y_j))^2}{(M+1)(N+1)}}$$

Which $x_i=i/M$, $y_j=i/N$ and $M=N=256$.

FIGS. 14A-14E show Tables 1410, 1420, 1430, 1440, 1450 respectively which provide the results of RMS error based on test functions $f_1$, $f_2$, $f_3$, $f_4$, $f_5$ for multilevel B-splines interpolation method (B), minimum curvature interpolation method (C) and the hierarchical MK splines approximation (M) of one example embodiment. From these tables, it is shown that under the same conditions RMS error of hierarchical MK splines approximation is usually the smallest.

Figure 15A:
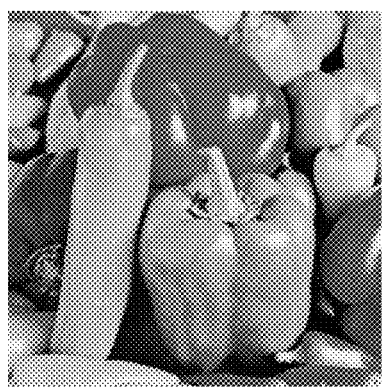
FIG. 15A shows an original image to be reconstructed in accordance with an example embodiment.
Figure 15B:
FIG. 15B shows an image depicting positions of sampled pixels in accordance with an example embodiment.
Figure 15C:
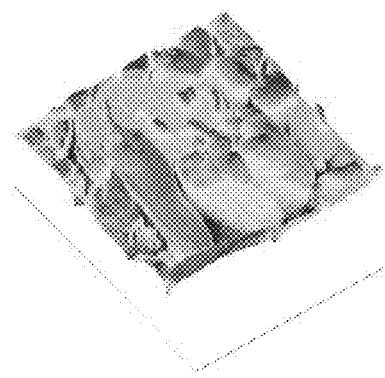
FIG. 15C shows an image depicting interpolated surface that is reconstructed in accordance with an example embodiment.
Figure 15D:
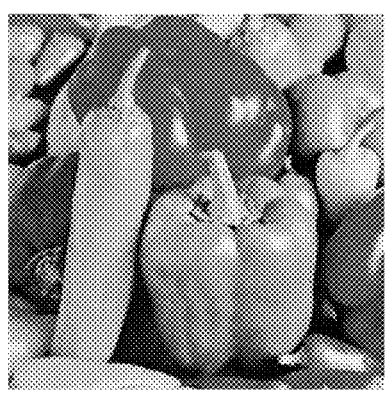
FIG. 15D shows a reconstructed image in accordance with an example embodiment.

One example embodiment is applied to non-uniform image sample. A grayscale image is considered as a surface in which the value of each pixel represents its height. Thus, image reconstruction from non-uniform samples is addressed as surface fitting for scattered data point and is solved by the hierarchical MK splines approximation. FIG. 15A shows original image 1510 to be reconstructed. Since an edge captures the visual detail of the image, the edge of the image is firstly identified by a Sobel operator. However, only a data set of edges is not sufficient to recover the image. Therefore, some data from the image is randomly sampled for reconstructing the parts of image where there are no nearby edge points. FIG. 15B shows image 1520 depicting the positions of the sampled pixels. FIG. 15C shows image 1530 depicting the interpolated surface that is reconstructed from the samples to which the hierarchical MK splines approximation is applied. At last the height is considered as the grayscale of points and the surface is changed to the reconstructed image 1540 as shown in FIG. 15D.

The original image 1510 to be reconstructed has the size of 512×512. The number of sample points in image 1520 is 41805, of which the edge consists of 18617 points. Thus, the sample possesses 15.9% of the total number of pixels in the original image. The hierarchical MK splines approximation which setting $m_0=8$, $n_0=8$ and $m_h=512$, $n_h=512$ for the size of coarsest and finest control lattices is applied. The reconstructed image 1540 is compared to the image 1510. The Peak Signal-to-Noise Ratio (PSNR) of reconstructed image 1540 is 32.6.

Figure 16A:
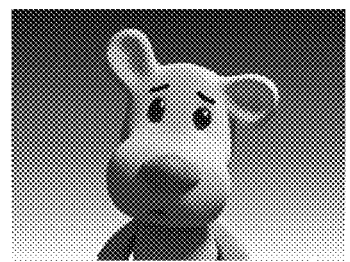
FIG. 16A shows an original image to be reconstructed in accordance with an example embodiment.
Figure 16B:
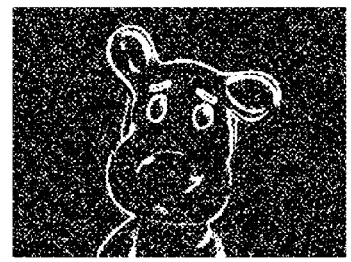
FIG. 16B shows an image depicting positions of sampled pixels in accordance with an example embodiment.
Figure 16C:
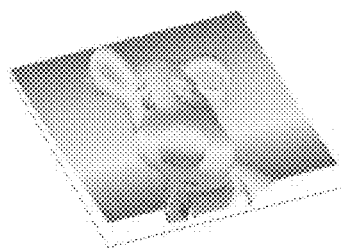
FIG. 16C shows an image depicting interpolated surface that is reconstructed in accordance with an example embodiment.
Figure 16D:
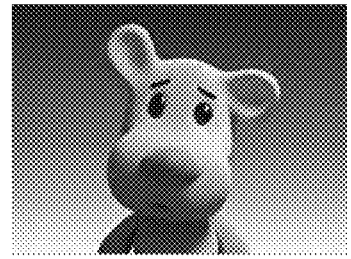
FIG. 16D shows a reconstructed image in accordance with an example embodiment.

In a further example embodiment, the size of the original image 1610 to be reconstructed in FIG. 16A is 193×257. FIG. 16B shows image 1620 depicting the positions of the sampled pixels. The number of sample points is 9133, of which the edge consists of 3769 points. Thus, the sample possesses 18.4% of the total number of pixels in the original image. The hierarchical MK splines approximation which setting $m_0=3$, $n_0=4$ and $m_h=193$, $n_h=257$ for the size of coarsest and finest control lattices is applied. FIG. 16C shows image 1630 depicting the interpolated surface that is reconstructed from the samples that is applied with the hierarchical MK splines approximation. FIG. 16D shows the obtained reconstructed image 1640. The reconstructed image 1640 is compared to the original image 1610. The PSNR of the reconstructed image is 39.6.

Figure 17A:
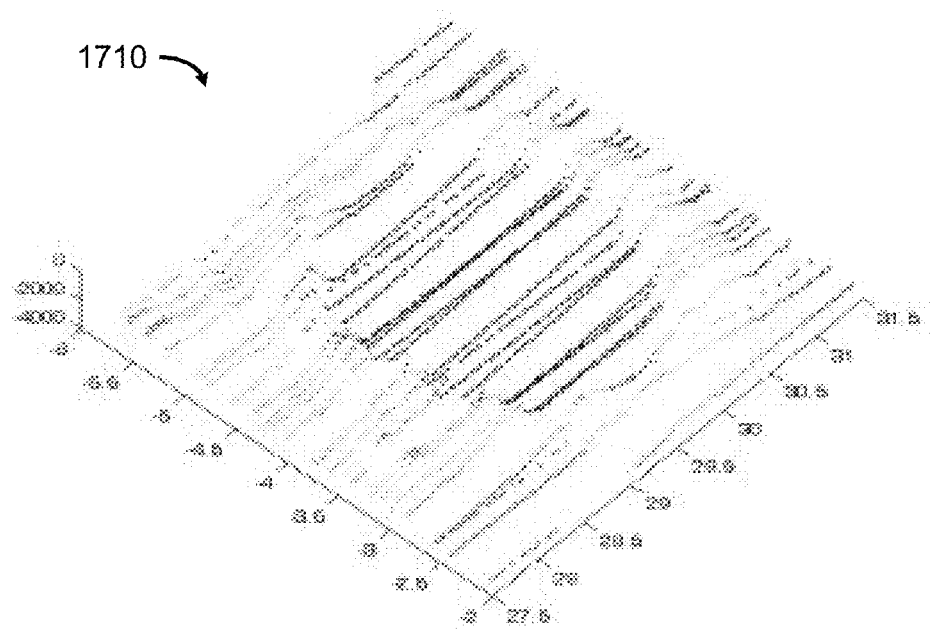
FIG. 17A shows a topographic map in accordance with an example embodiment.
Figure 17B:
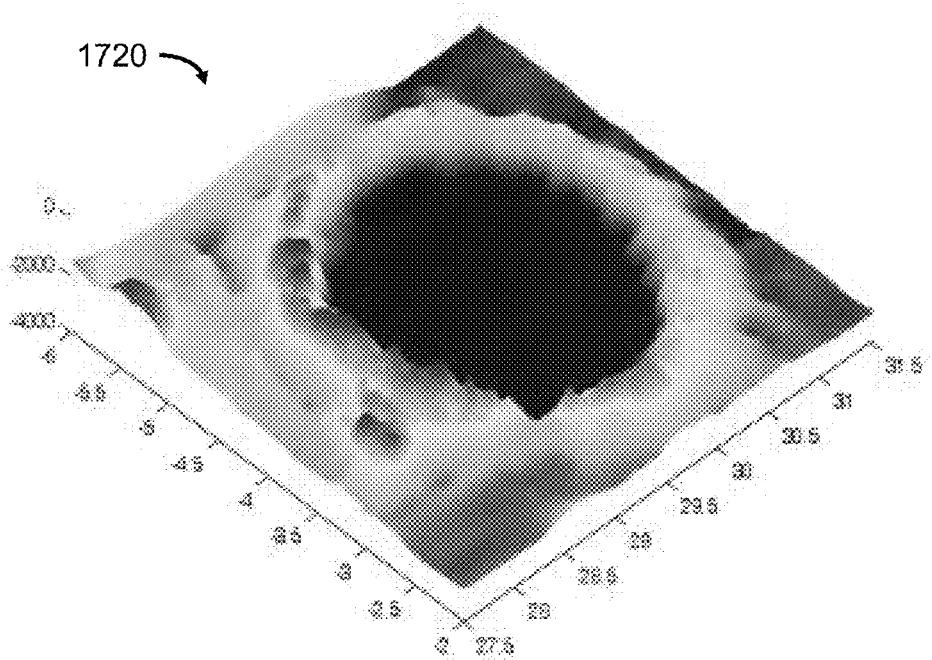
FIG. 17B shows Digital Elevation Model (DEM) surface of Archimedes Crater in accordance with an example embodiment.
Figure 18A:
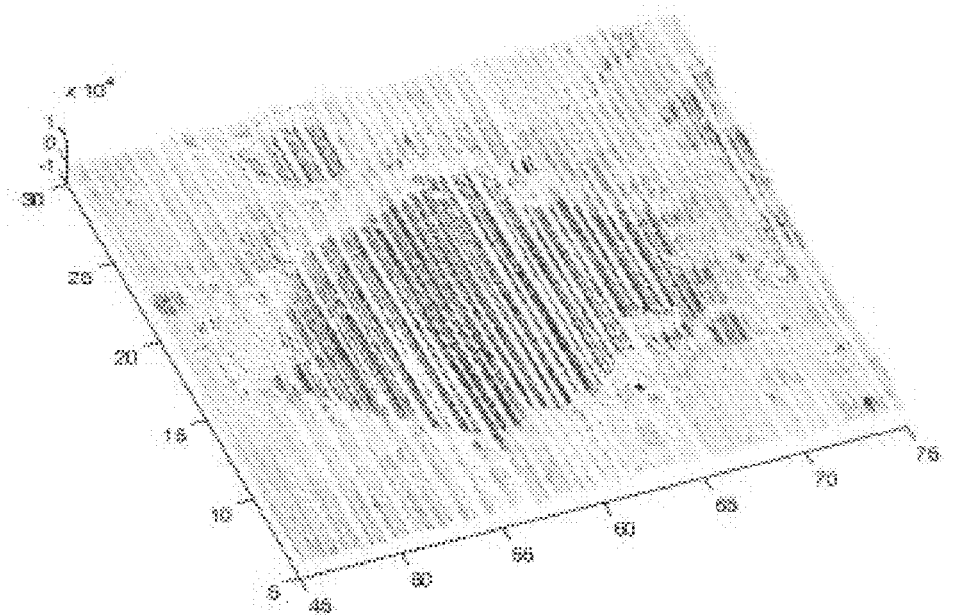
FIG. 18A shows a topographic map in accordance with an example embodiment.
Figure 18B:
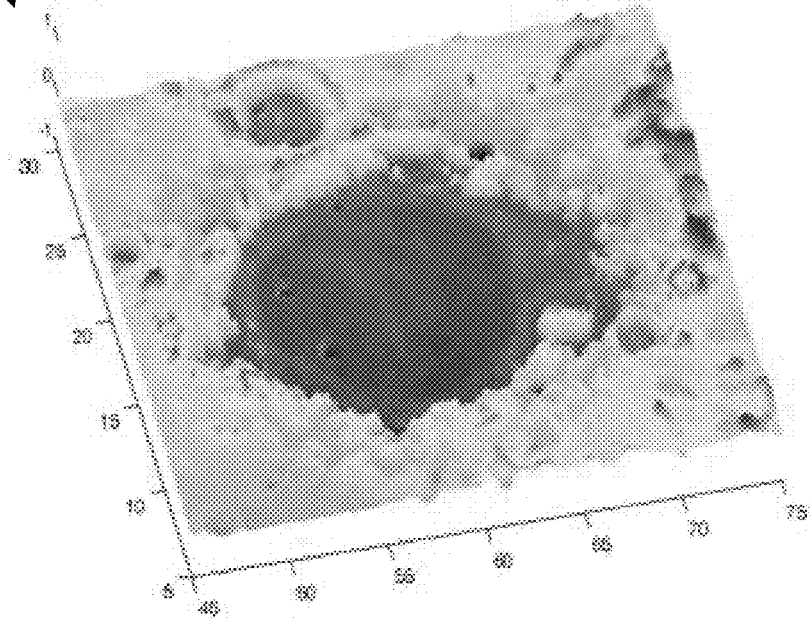
FIG. 18B shows Digital Elevation Model (DEM) surface of Mare Crisium in accordance with an example embodiment.
Figure 19A:
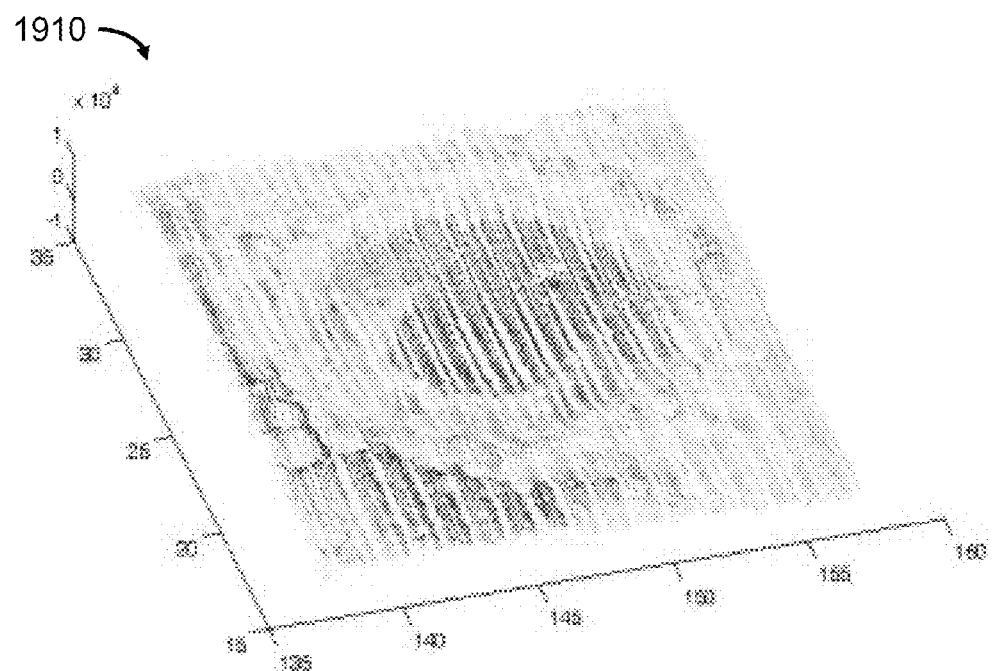
FIG. 19A shows a topographic map in accordance with an example embodiment.
Figure 19B:
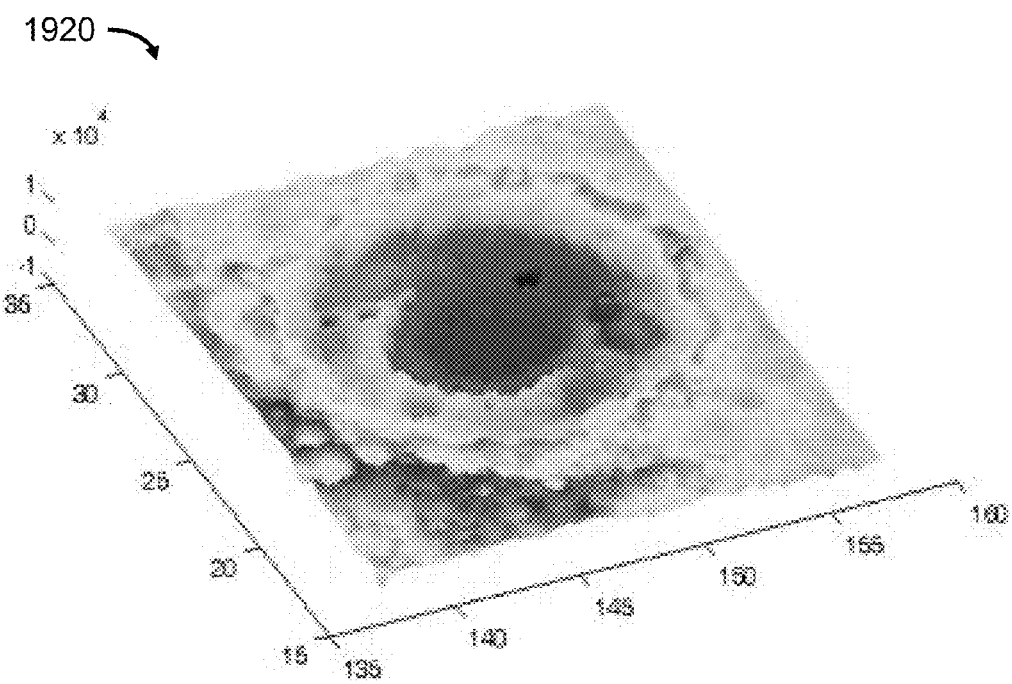
FIG. 19B shows Digital Elevation Model (DEM) surface of Mare Moscoviense in accordance with an example embodiment.

Example embodiments can be used to obtain an image that is constructed from a scattered data set using the hierarchical MK splines approximation. Chang'E-1 is the first lunar exploration mission of China, aiming to obtain 3D images of the lunar surface, analyze the content of useful elements and types of materials, and explore the characteristics of lunar soil and the space environment between the earth and the Moon. The Chang'E-1 satellite was successfully launched on Oct. 24, 2007 from Xichang Satellite Launch Center, and was placed into a 2-h circular lunar polar orbit on November 7th. One of the payloads of Chang'E-1, the Laser Altimeter (LAM) is used to measure the distance between the orbiter and the lunar surface, and a lunar topographic model can be obtained with these ranging measurements. FIG. 17A shows the topographic map 1710 of Archimedes Crater obtained from Chang'E-1 Laser Altimeter. FIG. 18A and FIG. 19A show the topographic map 1810 of Mare Crisium and the topographic map 1910 of Mare Moscoviense obtained from Chang'E-1 Laser Altimeter, respectively. FIG. 17B, FIG. 18B and FIG. 19B show Digital Elevation Model (DEM) surface 1720 of Archimedes Crater, DEM surface 1820 of Mare Crisium and DEM surface 1920 of Mare Moscoviense obtained in example embodiments respectively. The interpolation result shows the geologic landforms clearly.

Figure 20:
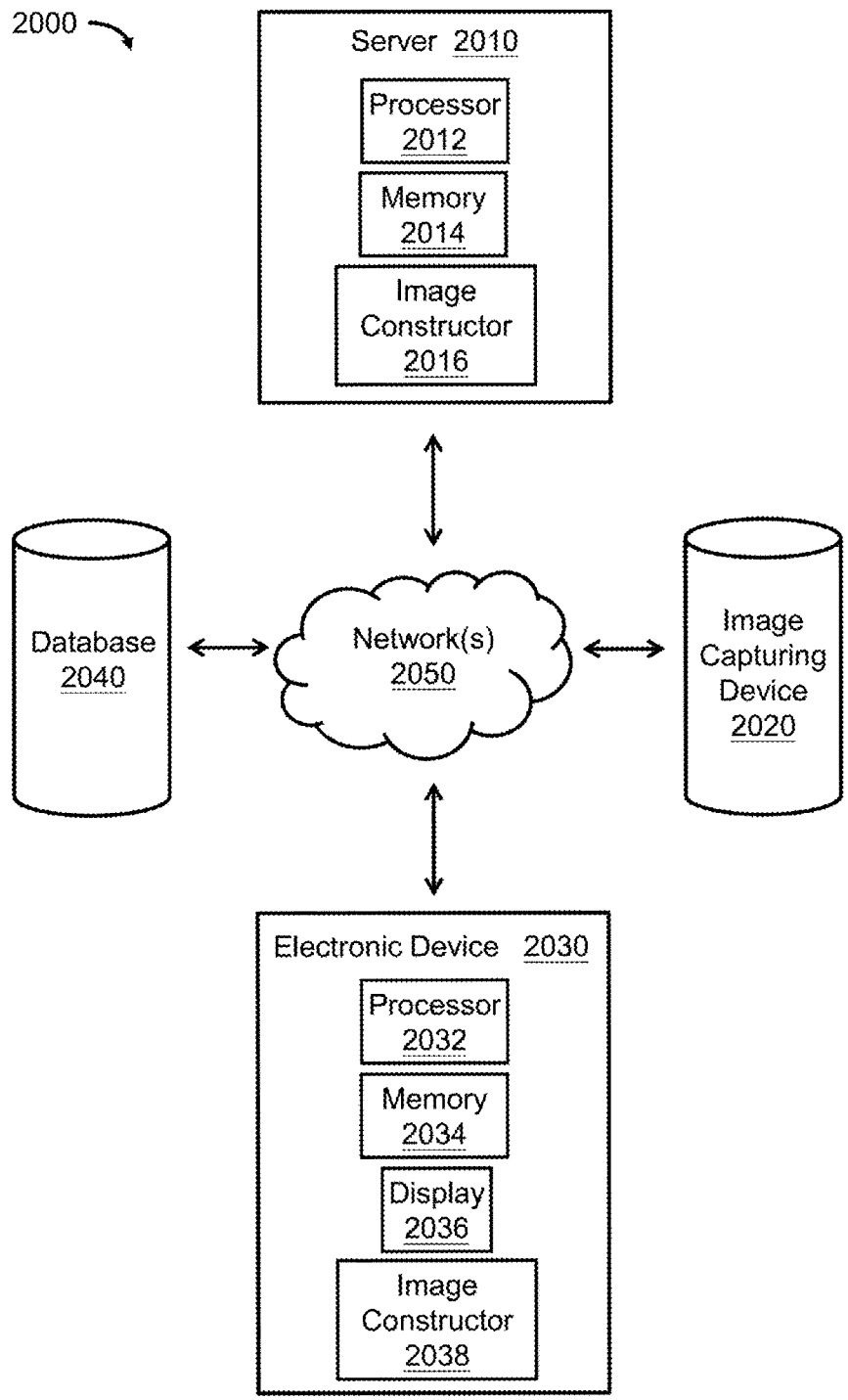
FIG. 20 shows a computer system executes and displays a constructed image generated from a scattered data set using hierarchical MK splines approximation in accordance with an example embodiment.

FIG. 20 shows a computer system 2000 that executes and displays a constructed image generated from a scattered data set V using hierarchical MK splines approximation in one example embodiment.

The computer system includes one or more of a server 2010, an image capturing device 2020, an electronic device 2030, and a database 2040 in communication via one or more networks 2050.

The server 2010 includes a processor or processing unit 2012, a memory 2014, and an image constructor 2016.

The image capture device 2020 include one or more devices to capture images, such as a lens or camera.

The electronic device 2030 includes one or more of a processor or processing unit 2032, memory 2034, display 2036, and image constructor 2038. Examples of an electronic device include, but are not limited to, laptop computers, desktop computers, tablet computers, handheld portable electronic devices (HPEDs), and other portable and non-portable electronic devices.

The database 2040 includes electronic storage or memory and can store images or other information to assist in executing example embodiments.

The network(s) 2050 can include one or more of a wired network or wireless network, such as the internet, cellular network, etc.

The processor, memory, and/or image constructor in the server 2010 and/or electronic device 2030 execute methods in accordance with example embodiments. The image constructor can include software and/or specialized hardware to execute example embodiments.

The processor unit includes a processor (such as a central processing unit, CPU, microprocessor, microcontrollers, field programmable gate array (FPGA), application-specific integrated circuit (ASIC), etc.) for controlling the overall operation of memory (such as random access memory (RAM) for temporary data storage, read only memory (ROM) for permanent data storage, and firmware). The processing unit and image constructor communicate with each other and memory and perform operations and tasks that implement one or more blocks of the flow diagrams discussed herein. The memory, for example, stores applications, data, programs, algorithms (including software to implement or assist in implementing example embodiments) and other data.

In some example embodiments, the methods illustrated herein and data and instructions associated therewith are stored in respective storage devices, which are implemented as computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to any manufactured single component or multiple components.

Blocks and/or methods discussed herein can be executed and/or made by a user, a user agent (including machine learning agents and intelligent user agents), a software application, an electronic device, a computer, firmware, hardware, a process, a computer system, and/or an intelligent personal assistant. Furthermore, blocks and/or methods discussed herein can be executed automatically with or without instruction from a user.

The methods in accordance with example embodiments are provided as examples, and examples from one method should not be construed to limit examples from another method. Further, methods discussed within different figures can be added to or exchanged with methods in other figures. Further yet, specific numerical data values (such as specific quantities, numbers, categories, etc.) or other specific information should be interpreted as illustrative for discussing example embodiments. Such specific information is not provided to limit example embodiments.

Example embodiments can be used to other areas of computer graphics, such as image warping, data compression, object reconstruction.

As used herein, "interpolation" is a method of constructing an underlying function or surface with which the value at any position in the domain can be calculated.

As used herein, scattered data refers to a set of sampling points which are randomly distributed in a 2-D plane or 3-D space.

As used herein, "Peak Signal-to-Noise Ratio" or "PSNR" is the ratio between the maximum possible power of a signal and the power of corrupting noise that affects the fidelity of its representation.

As used herein, "grayscale" is an image in which the value of each pixel is a single sample.

As used herein, "Digital Elevation Model" or "DEM" is a digital model of a terrain surface.

What is claimed is:

1. A method executed by a computer system to construct an image by generating a final approximation function f that approximates a scattered data set V, the method comprising:
setting, by the computer system, a hierarchy of control lattices $R_0, R_1, \ldots, R_h$, wherein $R_0$ is a coarsest control lattice and $R_h$ is a densest control lattice defined by a user, $R_k$ is a control lattice at level k of the hierarchy of control lattices, a spacing between control points in the control lattices is smaller from one lattice to the next;
executing, by the computer system, Many-Knot (MK) Splines approximation to V with the coarsest control lattice $R_0$ to obtain approximation function $f_0$ that is a most smooth approximation function of V;

calculating, by the computer system, a first deviation $\Delta^1 z_c$ of $f_0$ for each point in V to generate a deviation data set $V_1$;

performing, by the computer system, iteration steps for the control lattices from $R_1$ to $R_h$ to generate a sequence of approximation functions from $f_l$ to $f_h$, the iteration steps comprising:

for the level k of the hierarchy of control lattices, summing, by the computer system, $f_0$ to $f_{k-1}$ to yield a smaller deviation $\Delta^k z_c$ for each point in V to generate a deviation data set $V_k$;

executing, by the computer system, the Many-Knot (MK) Splines approximation with the control lattice $R_k$ to the deviation data set $V_k$ to obtain approximation function $f_k$;

generating, by the computer system, the final approximation function f by summing $f_0$ to $f_h$ to construct an interpolated surface; and constructing, by the computer system, the image from the interpolated surface.

2. The method of claim 1, further comprising: setting, by the computer system, the spacing between the control points in the control lattices to be halved from one lattice to the next of the hierarchy of control lattices.

3. The method of claim 1, further comprising: taking, by the computer system, a height of points as grayscale values to change the interpolated surface into the image.

4. The method of claim 1, further comprising: sampling, by the computer system, data points of V from an edge of an image to be reconstructed and randomly sampling, by the computer system, from parts of the image to be reconstructed where there are no nearby edge points.

5. The method of claim 1 further comprising: sampling, by the computer system, data points of V from a topographic map.

6. The method of claim 1 further comprising: generating, by the computer system, a digital elevation model from the interpolated surface.

7. The method of claim 1 further comprising: displaying the image by the computer system.

8. A computer system, comprising:
at least one processor;
a display; and
a computer-readable medium having stored therein instructions that when executed cause the at least one processor to:
receive data points of a scattered data set V of an image and set a hierarchy of control lattices $R_0, R_1, \ldots, R_h$, wherein $R_0$ is a coarsest control lattice and $R_h$ is a densest control lattice defined by a user, $R_k$ is a control lattice at level k of the hierarchy of control lattices, a spacing between control points in the control lattices is smaller from one lattice to the next;
generate an approximation function $f_0$ by applying Many-Knot (MK) Splines approximation to V with $R_0$;
generate a sequence of approximation function $f_k$ from level k=1 to k=h of the hierarchy of control lattices by applying Many-Knot (MK) Splines approximation to a deviation data set $V_k$ with $R_k$, wherein $V_k$ is produced by calculating a deviation of a sum of functions from $f_0$ to $f_{k-1}$ for each data points of V;
generate a final approximation function f by summing $f_0$ and the sequence of approximation function $f_k$ from level k=1 to k=h to generate an interpolated surface;
generate a reconstructed image from the interpolated surface; and
display the reconstructed image on the display.

9. The computer system of claim 8, wherein the spacing between the control points in the control lattices is halved from one lattice to the next of the hierarchy of control lattices.

10. The computer system of claim 8, wherein to generate the reconstructed image the system is further configured to change the interpolated surface by taking a height of points as grayscale values.

11. The computer system of claim 8, wherein the scattered data set V is sampled from an edge of the image and randomly sampled from parts of the image where there are no nearby edge points for the data points of V.

12. The computer system of claim 8, wherein the image is a topographic map.

13. The computer system of claim 8, wherein the reconstructed image is a digital elevation model surface of terrain.

* * * * *